United States Patent
Jwa et al.

(10) Patent No.: US 8,243,836 B2
(45) Date of Patent: Aug. 14, 2012

(54) CHANNEL ESTIMATION APPARATUS AND METHOD IN MOBILE COMMUNICATION SYSTEM HAVING DISPERSED PILOT

(75) Inventors: Hye Kyung Jwa, Daejeon (KR); Il Gyu Kim, Chungbuk (KR); Hyun Kyu Chung, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 404 days.

(21) Appl. No.: 12/633,329

(22) Filed: Dec. 8, 2009

(65) Prior Publication Data

US 2010/0150217 A1 Jun. 17, 2010

(30) Foreign Application Priority Data

Dec. 17, 2008 (KR) .................. 10-2008-0128835
Sep. 1, 2009 (KR) .................. 10-2009-0082065

(51) Int. Cl.
*H04L 27/28* (2006.01)
(52) U.S. Cl. ........................................... 375/260
(58) Field of Classification Search .............. 375/260, 375/340
See application file for complete search history.

(56) References Cited

U.S. PATENT DOCUMENTS

| 2006/0062322 | A1 | 3/2006 | Namgoong et al. | |
|---|---|---|---|---|
| 2006/0227748 | A1 | 10/2006 | Stamoulis et al. | |
| 2007/0183307 | A1* | 8/2007 | Akita et al. | 370/208 |
| 2008/0144730 | A1* | 6/2008 | Akella et al. | 375/260 |
| 2008/0304605 | A1* | 12/2008 | Aziz et al. | 375/347 |
| 2009/0323871 | A1* | 12/2009 | Merched et al. | 375/346 |

FOREIGN PATENT DOCUMENTS

| JP | 2008-514124 A | 5/2008 |
|---|---|---|
| JP | 2008-199612 A | 8/2008 |
| JP | 2008-538263 A | 10/2008 |
| WO | 2007/051125 A1 | 5/2007 |

* cited by examiner

*Primary Examiner* — Don N Vo
(74) *Attorney, Agent, or Firm* — Kile Park Goekjian Reed & McManus PLLC

(57) ABSTRACT

Provided are a channel estimation method and apparatus in mobile communication system having dispersed pilot. The channel estimation apparatus includes an entire band channel estimation unit and an edge channel estimation unit. The entire band channel estimation unit performs channel estimation on an entire frequency band. The edge channel estimation unit performs channel estimation on an edge region. By separately performing the gating operation of the entire band channel estimation unit and the gating operation of the edge channel estimation unit, a channel frequency response is more accurately calculated even in an edge region.

18 Claims, 8 Drawing Sheets

CHANNEL ESTIMATION APPARATUS AND METHOD IN MOBILE COMMUNICATION SYSTEM HAVING DISPERSED PILOT

CROSS-REFERENCE TO RELATED APPLICATIONS

This application claims priority under 35 U.S.C. §119 to Korean Patent Application No. 10-2008-0128835, filed on Dec. 17, 2008 and Korean Patent Application No. 10-2009-0082065, filed on Sep. 1, 2009 in the Korean Intellectual Property Office, the disclosures of which are incorporated herein by reference in its entirety.

TECHNICAL FIELD

The following disclosure relates to a channel estimation apparatus and method in mobile communication system, and in particular, to a channel estimation apparatus and method in mobile communication system, which uses a Single Carrier Frequency Division Multiple Access (SC-FDMA) scheme or an Orthogonal Frequency Division Multiple Access (OFDMA) scheme based on a dispersed pilot.

BACKGROUND

Many mobile communication technologies are adopting an OFDMA scheme or a SC-FDMA scheme. In IEEE 802.16, 802.20 and Wibro systems that are applied to a portable Internet system, the OFDMA scheme is adopted as the standard. Standardization for a cellular system is made in 3 Generation Partnership Project (3GPP). 3GPP adopted the OFDMA scheme and the SC-FDMA scheme.

A communication system using the OFDMA scheme and the SC-FDMA scheme uses a cyclic prefix symbol. At this point, the length of the cyclic prefix symbol is designed longer than that of the impulse response of a channel for overcoming limitations caused by multipath fading. Accordingly, by using a single tap equalizer in a frequency domain, the distortion of an estimated channel is compensated. In this case, the accurate estimation of a channel is required for compensating the distortion of the channel.

In a mobile communication system having dispersed pilots, a channel estimation operation is performed using the dispersed pilots, and the channel between a plurality of data sub-carriers is estimated through the channel estimation operation. That is, a Least Square (LS) estimator estimates a channel with a pilot sub-carrier, and channel-estimated values, i.e., channels between the data sub-carriers are estimated in a linear interpolation scheme. In such a method, however, the maximum delay time of a wireless channel is long. In the estimation of a channel having high frequency selectivity, accordingly, channel estimation performance is degraded. For solving this, a channel estimation method in a time domain using a Fast Fourier Transform (FFT) scheme is applied.

The channel estimation method in the time domain changes channel-estimated values, in which the LS estimator has estimated channels for a pilot sub-carrier, into a time domain through an Inverse Fast Fourier Transform (IFFT) scheme. Subsequently, an N-point FFT operation is performed through an operation of extracting samples in which the power of a sample in a desired time domain exceeds a specific critical value, i.e., a gating operation. When the N-point FFT operation is completed, channel estimation in a pilot sub-carrier and a channel frequency response in a data sub-carrier position are acquired.

In a channel estimation method in a time domain, when the gating operation is completed, performance is improved in portions other than the both end regions (hereinafter referred to as an edge) of an IFFT input, irrespective of a frequency selectivity. However, channel estimation performance is degraded in the edge region of the IFFT input. This provides causes that further deteriorate the channel estimation performance by being added to the Gibbs phenomenon that occurs when a time domain is changed into a frequency domain.

SUMMARY

In one general aspect, a channel estimation method in a mobile communication system includes: extracting a plurality of samples, in which a power of a sample in a time domain exceeds a first critical value, from a received pilot signal to perform channel estimation of an entire frequency band; extracting a plurality of samples, in which a power of a sample in a time domain exceeds a second critical value, from an edge of an Inverse Fast Fourier Transform (IFFT) input in the received pilot signal to perform channel estimation on the edge of the IFFT input; and estimating a final channel frequency response on the basis of a channel estimation result of the entire frequency band and a channel estimation result for the edge of the IFFT input.

In another general aspect, a channel estimation method in a mobile communication system includes: extracting a plurality of samples, in which a power of a sample in a time domain exceeds a first critical value, from a received pilot signal to perform channel estimation of an entire frequency band; setting an edge channel estimation mode; and extracting a plurality of samples, in which a power of a sample in a time domain exceeds a second critical value, from an edge of an Inverse Fast Fourier Transform (IFFT) input in the received pilot signal to perform channel estimation on the edge of the IFFT input, according to the edge channel estimation mode.

In another general aspect, a channel estimation apparatus in a mobile communication system includes: an entire band channel estimation unit extracting a plurality of samples, in which a power of a sample in a time domain exceeds a first critical value, from a received pilot signal to perform channel estimation of an entire frequency band; an edge channel estimation unit extracting a plurality of samples, in which a power of a sample in a time domain exceeds a second critical value, from an edge of an Inverse Fast Fourier Transform (IFFT) input in the received pilot signal to perform channel estimation on the edge of the IFFT input; and a channel frequency response output unit estimating a final channel frequency response on the basis of a channel estimation result of the entire frequency band and a channel estimation result for the edge of the IFFT input.

Other features and aspects will be apparent from the following detailed description, the drawings, and the claims.

DETAILED DESCRIPTION OF EMBODIMENTS

Figure 1:
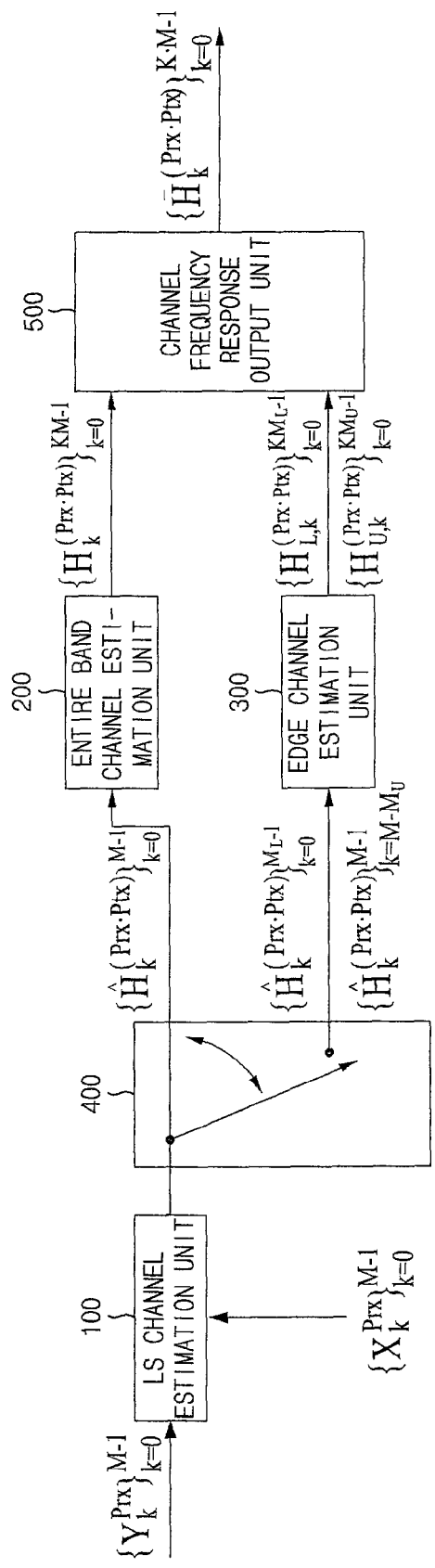
FIG. 1 is a block diagram illustrating a channel estimation apparatus according to an exemplary embodiment.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a block diagram illustrating a channel estimation apparatus according to an exemplary embodiment.

Referring to FIG. 1, a channel estimation apparatus according to an exemplary embodiment includes an LS channel estimation unit 100, an entire band channel estimation unit 200, an edge channel estimation unit 300, an edge channel estimation mode selection unit 400, and a channel frequency response output unit 500. Moreover, although not shown, the channel estimation apparatus may further include a plurality of reception antennas.

The plurality of reception antennas 1 to Prx output a pilot reception signal $\{Y_k^{Prx}\}_{k=0}^{M-1}$ in response to a pilot transmission signal transmitted from a plurality of transmission antennas 1 to Ptx. Herein, $\{\ \}_{k=0}^{M-1}$ means a set that is composed of an M number of elements, and $Y_k^{Prx}$ means a reception signal in a kth pilot sub-carrier that is received through the Prx-th reception antenna. Accordingly, $\{Y_k^{Prx}\}_{k=0}^{M-1}$ means a set of M pilot sub-carriers.

The LS channel estimation unit 100 receives the pilot reception signal $\{Y_k^{Prx}\}_{k=0}^{M-1}$ from the reception antennas 1 to Prx to estimate a channel according to an LS technique. That is, the LS channel estimation unit 100 divides the pilot reception signal $\{Y_k^{Prx}\}_{k=0}^{M-1}$ by a reference signal $\{X_k^{Ptx}\}_{k=0}^{M-1}$ corresponding to the kth pilot sub-carrier of the Ptx-th transmission antenna to calculate the channel frequency responses $\{\hat{H}_k^{(Prx,Ptx)}\}_{k=0}^{M-1}$ the pilot sub-carriers.

The channel frequency responses $\{\hat{H}_k^{(Prx,Ptx)}\}_{k=0}^{M-1}$ of the calculated M pilot sub-carriers are provided to the entire band channel estimation unit 200 and the edge channel estimation unit 300. Herein, $\{\hat{H}_k^{(Prx,Ptx)}\}_{k=0}^{M-1}$ means the least square estimation value of a pilot channel frequency response between the Prx-th reception antenna and the Ptx-th transmission antenna in the kth pilot sub-carrier.

The entire band channel estimation unit 200 always operates. However, the edge channel estimation unit 300 operates according to the switching operation of the edge channel estimation mode selection unit 400.

In the case of a sub-carrier that is modulated through 64 Quadrature Amplitude Modulation (QAM) and 16 QAM requiring high channel estimation performance due to a high Signal to Noise Ratio (SNR), the edge channel estimation mode selection unit 400 drives the edge channel estimation unit 300. Moreover, the channel estimation mode selection unit 400 sets parameters necessary for the edge channel estimation unit 300.

Hereinafter, the entire band channel estimation unit 200 will be described in detail.

Figure 2:
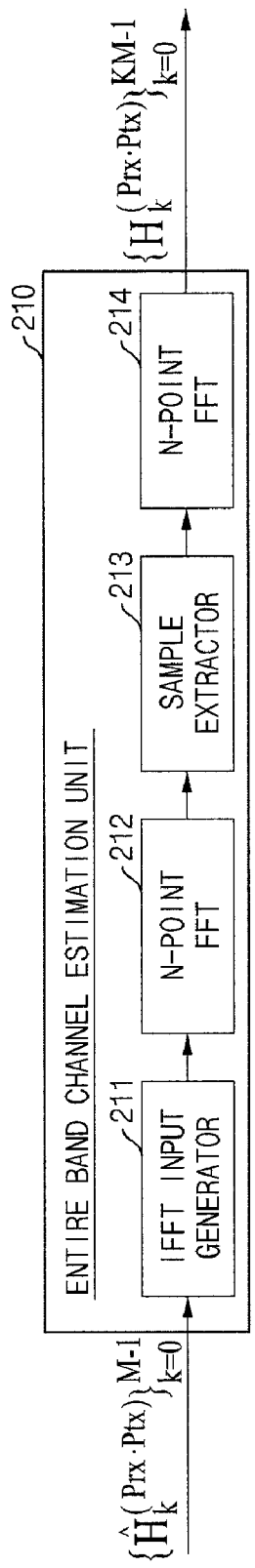
FIG. 2 is a block diagram illustrating the configuration of an entire band channel estimation unit in FIG. 1, according to an exemplary embodiment.
Figure 3:
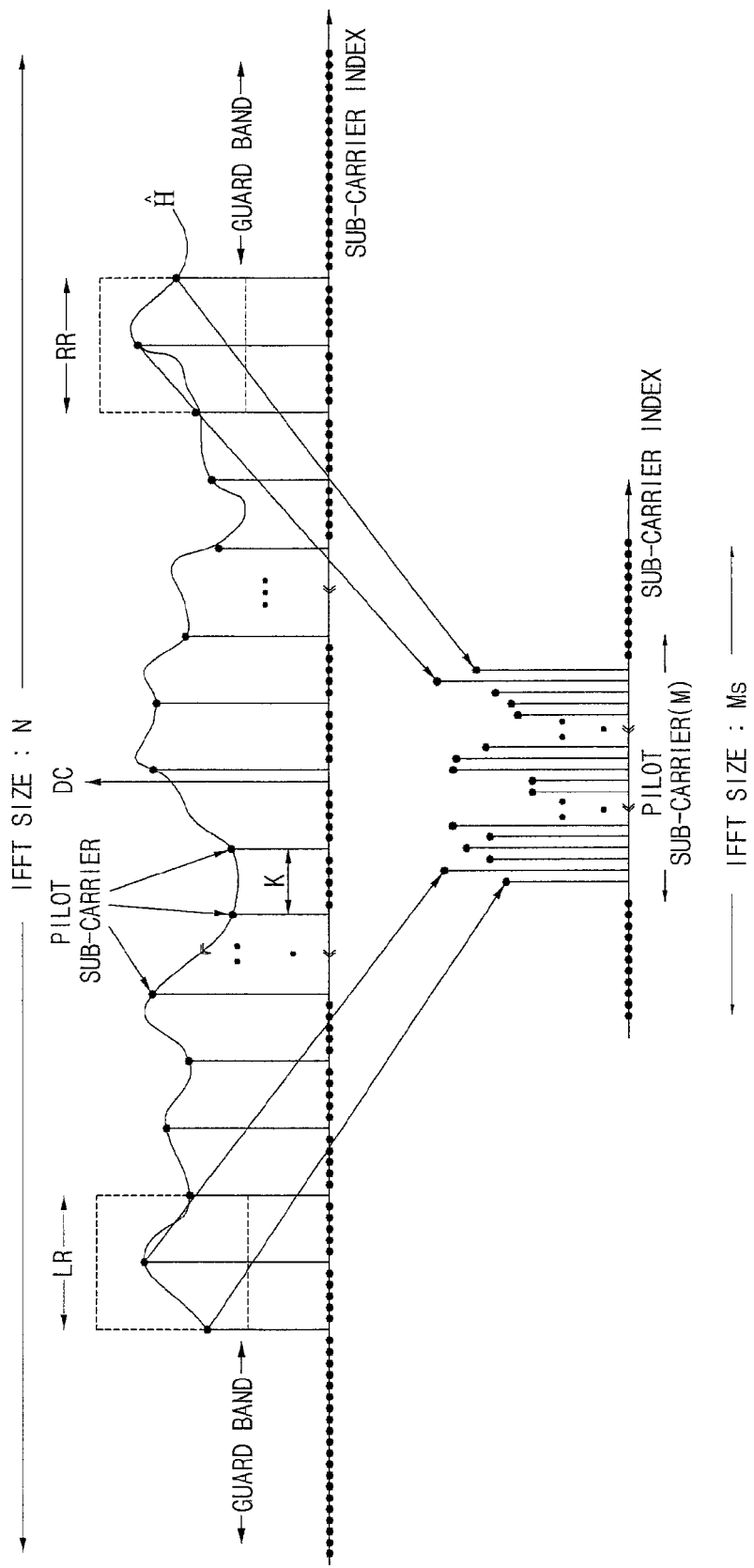
FIG. 3 is a diagram illustrating the channel frequency response of pilot sub-carriers including an edge section in an entire frequency band, according to an exemplary embodiment.

FIG. 2 is a block diagram illustrating the configuration of the entire band channel estimation unit in FIG. 1, according to an exemplary embodiment. FIG. 3 is a diagram illustrating the channel frequency responses of pilot sub-carriers including an edge section in an entire frequency band, according to an exemplary embodiment. Herein, an upper figure in FIG. 3 illustrates the channel frequency responses of the pilot sub-carriers that are inputted to the entire band channel estimation unit 200 in FIG. 2, and a lower figure in FIG. 3 illustrates the channel frequency responses of the pilot sub-carriers in an entire frequency band that is inputted to the entire band channel estimation unit 200 in FIG. 2.

Referring to FIGS. 2 and 3, an entire band channel estimation unit 210 according to an exemplary embodiment includes an IFFT input generator 211, an N-point IFFT 212, a sample extractor 213, and an N-point FFT 214.

The IFFT input generator 211 sets the exponent size of 2, greater than the number of sub-carriers of an entire frequency band, as an IFFT size 'N', and inputs the channel frequency responses of the pilot sub-carriers to a sub-carrier position that is assigned in actual transmission. Subsequently, the IFFT input generator 211 inserts '0' into another sub-carrier position and another guar band. Therefore, an IFFT input for entire band channel estimation is generated.

The N-point IFFT 212 performs an IFFT operation on the IFFT input to calculate the time domain response of the pilot signal. The time domain response of the pilot signal is repeated by a pilot sub-carrier interval K in a frequency domain and is thereby emerged.

The sample extractor 213 extracts a plurality of samples from a time domain response that is at the first stage in a repeated time domain response, on the basis of multipath delay. At this point, an operation of extracting samples, in which the power of each sample exceeds a predetermined critical value (where α is a real number more than 0), is referred to as a gating operation. '0' is inserted into the positions of other time domain samples that are not extracted by the sample extractor 213, and the inserted '0' and an output including a plurality of samples are provided to the N-point FFT 214.

The N-point FFT 214 performs an FFT operation on the output of the sample extractor 213 to calculate a channel frequency response $\{\tilde{H}_k^{(Prx,Ptx)}\}_{k=0}^{M-1}$ for the pilot sub-carrier and the data sub-carrier.

Figure 4:
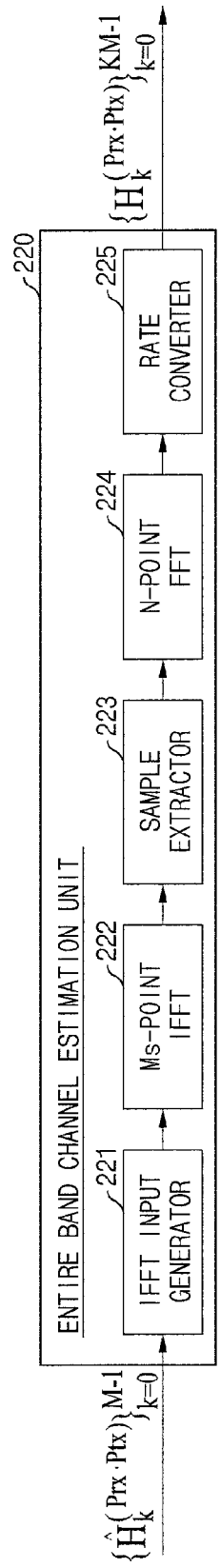
FIG. 4 is a block diagram illustrating an entire band channel estimation unit in FIG. 1, according to another exemplary embodiment.

FIG. 4 is a block diagram illustrating the entire band channel estimation unit in FIG. 1, according to another exemplary embodiment.

Referring to FIGS. 3 and 4, an entire band channel estimation unit 220 according to another exemplary embodiment includes an IFFT input generator 221, an Ms-point IFFT 222, a sample extractor 223, an N-point FFT 224, and a rate converter 225.

The entire band channel estimation unit 220 in FIG. 3 collects the channel frequency responses of the pilot sub-carriers to perform an IFFT operation on the collected responses. That is, the IFFT input generator 221 sets the exponent size of 2 greater than 'M' as an IFFT size 'Ms', and inserts two guard bands into the left and right of the channel frequency responses of the pilot sub-carriers to generate an IFFT input. At this point, the size of the guard band is "(Ms−M)/2". Herein, 'M' is the number of pilot sub-carriers, and 'Ms' is the size of IFFT for selecting only a pilot sub-carrier to estimate a channel.

The Ms-point IFFT 222 performs an IFFT operation on the generated IFFT input to calculate the time domain response of the pilot signal. Only one time domain response is emerged regardless of a pilot sub-carrier interval 'K'.

The sample extractor 223 extracts a plurality of samples from the time domain response on the basis of multipath delay. At this point, the sample extractor 223 extracts only samples in which the power of each sample exceeds a predetermined critical value (where β is a real number more than 0). '0' is inserted into the positions of other time domain samples that are not extracted by the sample extractor 213. Moreover, because a channel for the sub-carrier of an entire frequency band is required, '0' is additionally inserted into the positions of the other time domain samples for performing an N-point FFT operation.

The N-point FFT 224 performs an FFT operation on the output of the sample extractor 223.

When the pilot sub-carrier interval 'K' is the exponent of 2, the rate converter 225 is not required. When the pilot sub-carrier interval 'K' is not the exponent of 2, because channel estimation between the pilot sub-carriers is performed "N/Ms" times, the rate converter 225 extracts a channel equal to the pilot sub-carrier interval 'K' to calculate a channel frequency response $\{\hat{H}_k^{(Prx,Ptx)}\}_{k=0}^{KM-1}$ for an entire band sub-carrier by using an extracted result.

Hereinafter, the edge channel estimation unit 300 will be described in detail.

Figure 5:
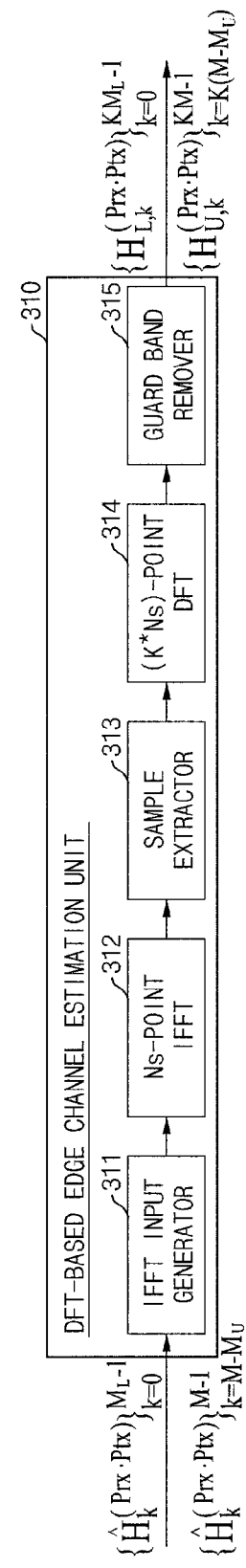
FIG. 5 is a block diagram illustrating the configuration of an edge channel estimation unit in FIG. 1, according to an exemplary embodiment.
Figure 6:
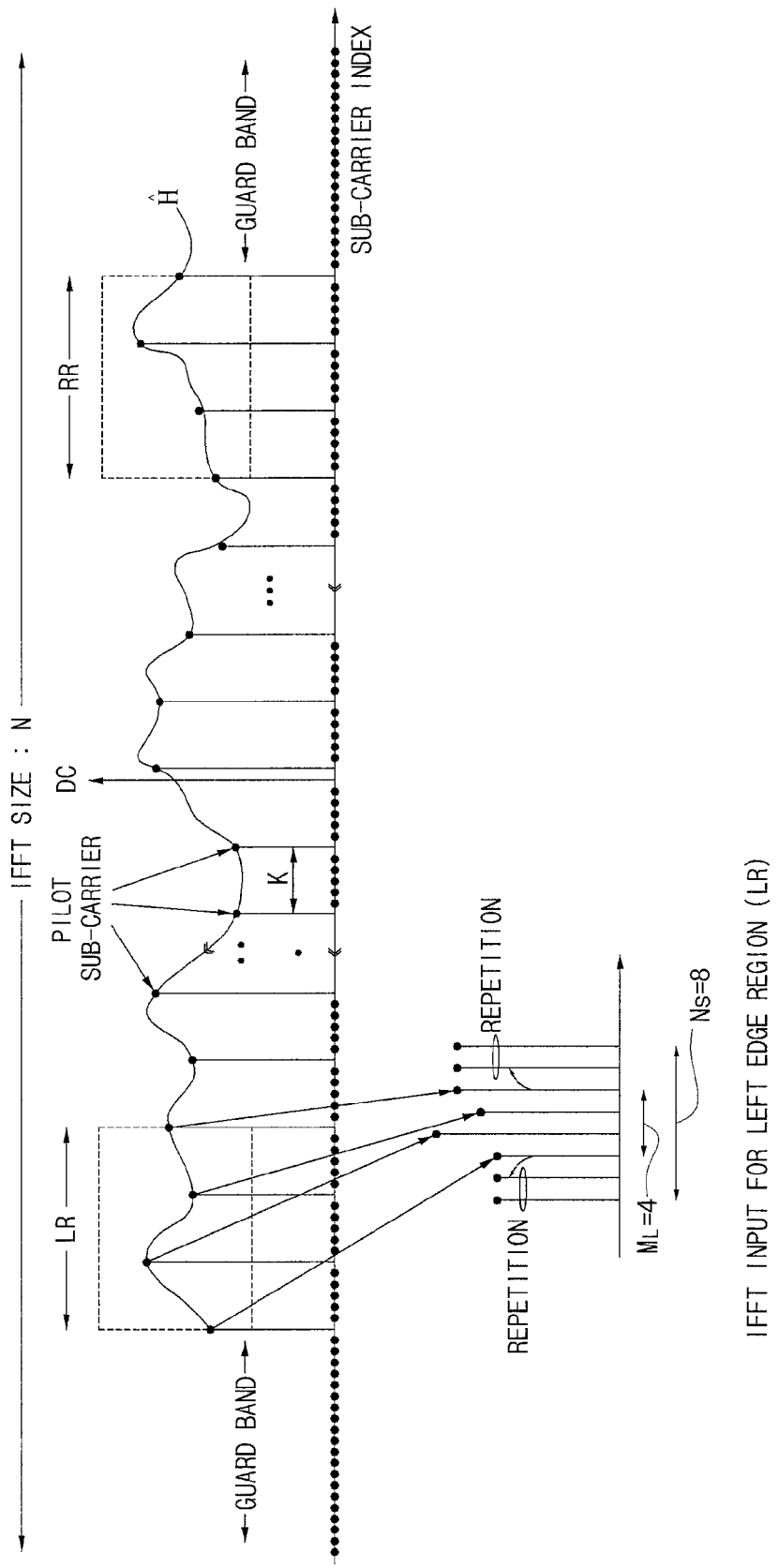
FIG. 6 is a diagram illustrating an IFFT input corresponding to an edge region that is generated through an IFFT input generator in FIG. 5.
Figure 7:
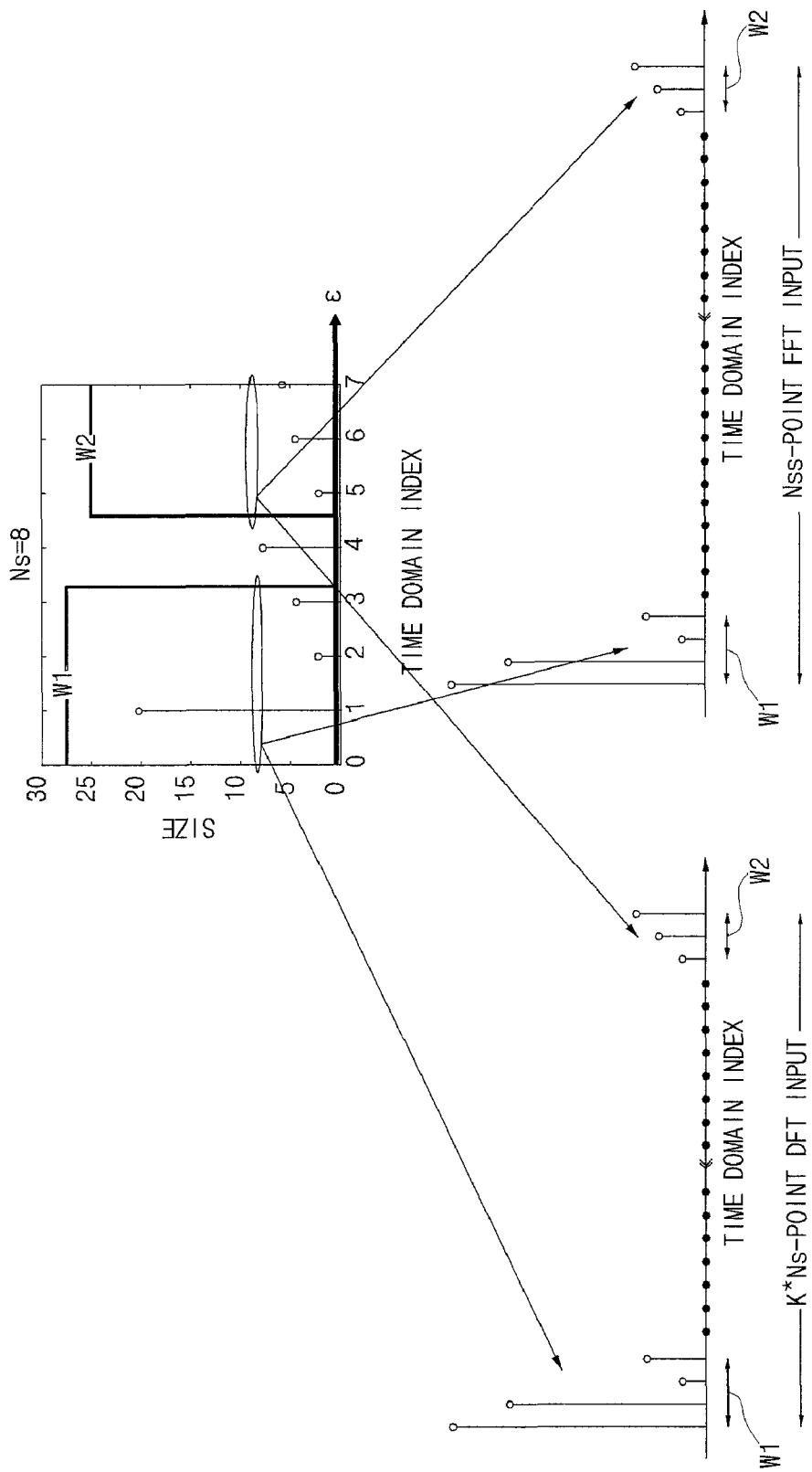
FIG. 7 is a diagram illustrating the output result of an Ns-point IFFT in FIG. 5, the output result of a sample extractor in FIG. 5 and the output result of a sample extractor in FIG. 8.

FIG. 5 is a block diagram illustrating the configuration of the edge channel estimation unit in FIG. 1, according to an exemplary embodiment. FIG. 6 is a diagram illustrating an IFFT input corresponding to an edge region that is generated through the IFFT input generator in FIG. 5. FIG. 7 is a diagram illustrating the output result of the Ns-point IFFT 312 in FIG. 5, the output result of the sample extractor 313 in FIG. 5 and the output result of the sample extractor 323 in FIG. 8. That is, the output result of the Ns-point IFFT 312 is illustrated in the upper portion of FIG. 5, the input of a K*Ns-point Discrete Fourier Transform (DFT) is illustrated in the left of the lower portion of FIG. 5, and an Nss-point input is illustrated in the right of the lower portion of FIG. 5. Moreover, for convenience, FIG. 6 illustrates only an IFFT input for a left edge region LR that is generated through the IFFT input generator among an edge region including the left edge region LR and a right edge region RR.

Referring to FIGS. 5 and 6, an edge channel estimation unit 310 according to an exemplary embodiment performs channel estimation of a time domain based on DFT. That is, the edge channel estimation unit 310 performs edge channel estimation on a left edge region LR adjacent to a left guard band, i.e., the channel frequency responses $\{\hat{H}_k^{(Prx,Ptx)}\}_{k=0}^{M_L-1}$ of an $M_L$ number of pilot sub-carriers and a right edge region RR adjacent to a right guard band, i.e., the channel frequency responses $\{\hat{H}_k^{(Prx,Ptx)}\}_{k=0}^{M_U-1}$ of an $M_U$ number of pilot sub-carriers, among the channel frequency responses $\{\hat{H}_k^{(Prx,Ptx)}\}_{k=M-M_U-1}^{M-1}$ of an M number of pilot sub-carriers that are transferred from the LS channel estimation unit 100 (see FIG. 1), respectively. Herein, '$M_L$' and '$M_U$' may be variably set according to a system designer. As an example, six and seven pilot sub-carriers may be set, respectively. For example, in the case of an edge region in which a sub-carrier interval is 15 KHz, a pilot sub-carrier interval is '6' and a bandwidth is about 600 KHz, six pilot sub-carriers among an M number of pilot sub-carriers are assigned to a left edge region adjacent to the left guard band, and seven pilot sub-carriers among the M pilot sub-carriers are assigned to a right edge region adjacent to the right guard band.

In this embodiment, as illustrated in the upper portion of FIG. 6, the following description will be made on the assumption of that four pilot sub-carriers are assigned to a left edge region LR adjacent to a left guard band and a right edge region RR adjacent to a right guard band.

Specifically, the edge channel estimation unit 310 includes an IFFT input generator 311, an Ns-point IFFT 312, a sample estimator 313, a (K*Ns)-point DFT 314, and a guard band remover 315.

The IFFT input generator 311 sets the exponent value of 2 greater than '$M_L$' and '$M_U$' as an IFFT size 'Ns', and generates an IFFT input $\{\tilde{G}_{L,k}^{(Prx,Ptx)}\}_{k=0}^{N_S-1}$ for a left edge region LR and an IFFT input $\{\tilde{G}_{U,k}^{(Prx,Ptx)}\}_{k=0}^{N_S-1}$ for a right edge region RR, as expressed in Equation (1).

$$G_{L,k}^{(Prx,Ptx)} = \begin{cases} \hat{H}_0^{(Prx,Ptx)}, & 0 \le k < \frac{(N_S - M_L)}{2} \\ \hat{H}_k^{(Prx,Ptx)}, & \frac{N_S - M_L}{2} \le k < \frac{(N_S + M_L)}{2} \\ \hat{H}_{M_L-1}^{(Prx,Ptx)}, & \frac{(N_S + M_L)}{2} \le k < N_S \end{cases} \quad (1)$$

$$G_{U,k}^{(Prx,Ptx)} = \begin{cases} \hat{H}_{M-M_U}^{(Prx,Ptx)}, & 0 \le k < \frac{(N_S - M_L)}{2} \\ \hat{H}_{(M-1)-(M_U-k)}^{(Prx,Ptx)}, & \frac{(N_S - M_L)}{2} \le k < \frac{(N_S + M_L)}{2} \\ \hat{H}_{M-1}^{(Prx,Ptx)}, & \frac{(N_S + M_L)}{2} \le k < N_S \end{cases}$$

Herein, '0' is not inserted into left and right guard bands other than the channel frequency responses of an $M_L$ or $M_U$ number of pilot sub-carriers, and as illustrated in the lower portion of FIG. 6, the values V1 and V2 of both ends are expanded (i.e., repeated). This is for preventing the frequency response of both ends from reaching '0'.

The Ns-point IFFT 312 performs an IFFT operation on the IFFT input $\{\tilde{G}_{L,k}^{(Prx,Ptx)}\}_{k=0}^{N_S-1}$ of a left edge region LR and the IFFT input $\{\tilde{G}_{U,k}^{(Prx,Ptx)}\}_{k=0}^{N_S-1}$ of a right edge region RR that are generated through the IFFT input generator 311. Consequently, the time domain response $\{g_{L,n}^{(Prx,Ptx)}\}_{n=0}^{N_S-1}$ of a pilot signal for the left edge region LR and the time domain response $\{g_{U,k}^{(Prx,Ptx)}\}_{k=0}^{N_S-1}$ of a pilot signal for the right edge region RR are calculated.

The sample extractor 313 extracts a plurality of samples on the basis of multipath delay and provides the extracted samples to the (K*Ns)-point DFT 314.

Referring to FIG. 7, the sample extractor 313 extracts only samples in which the power of each sample exceeds a predetermined critical value (where E is a real number more than 0), and generates a DFT input as expressed in the following Equation. Herein, the size of DFT 314 is K*Ns.

$$\tilde{g}_{L,n}^{(Prx,Ptx)} = \begin{cases} g_{L,n}^{(Prx,Ptx)}, & |g_{L,n}^{(Prx,Ptx)}|^2 \geq \varepsilon \text{ and } n < W_1 \\ g_{L,n-(K\cdot N_S-N_S)}^{(Prx,Ptx)}, & |g_{L,n-(K\cdot N_S-N_S)}^{(Prx,Ptx)}|^2 \geq \\ & \varepsilon \text{ and } (n - K \cdot N_S) \geq \\ & -W_2, n = 0, 1, \ldots, K \cdot N_S - 1 \\ 0, & \text{otherwise} \end{cases}$$

$$\tilde{g}_{U,n}^{(Prx,Ptx)} = \begin{cases} g_{U,n}^{(Prx,Ptx)}, & |g_{U,n}^{(Prx,Ptx)}|^2 \geq \varepsilon \text{ and } n < W_1 \\ g_{U,n-(K\cdot N_S-N_S)}^{(Prx,Ptx)}, & |g_{U,n-(K\cdot N_S-N_S)}^{(Prx,Ptx)}|^2 \geq \\ & \varepsilon \text{ and } (n - K \cdot N_S) \geq \\ & -W_2, n = 0, 1, \ldots, K \cdot N_S - 1 \\ 0, & \text{otherwise} \end{cases}$$

where W1 is a gating parameter in a positive region, W2 is a gating parameter in a negative region. W1 and W2 are determined on the basis of multipath delay. As an example, when ε is '0', all the samples of all time domains are selected, whereupon an interpolation operation is performed through DFT.

The (K*Ns)-point DFT 314 receives a K*Ns size of DFT input signal from the sample extractor 313 and calculates a pilot channel frequency response $\{\tilde{G}_{L,k}^{(Prx,Ptx)}\}_{k=0}^{KN_S-1}$ corresponding to a left edge region LR and a pilot channel frequency response $\{\tilde{G}_{U,k}^{(Prx,Ptx)}\}_{k=0}^{KN_S-1}$ corresponding to a right edge region RR.

The guard band remover 315, as expressed in the following Equation, removes most of a guard band that is inserted by the IFFT input generator 311 to output the channel frequency response of an edge portion.

$$\tilde{H}_{L,k}^{(Prx,Ptx)} = \tilde{G}_{L,k+\frac{K(N_S-M_L)}{2}}^{(Prx,Ptx)}, k = 0, 1, \ldots, K \cdot M_L - 1$$

$$\tilde{H}_{U,k}^{(Prx,Ptx)} = \tilde{G}_{U,k+\frac{K(N_S-M_L)}{2}}^{(Prx,Ptx)}, k = 0, 1, \ldots, K \cdot M_U - 1$$

Figure 8:
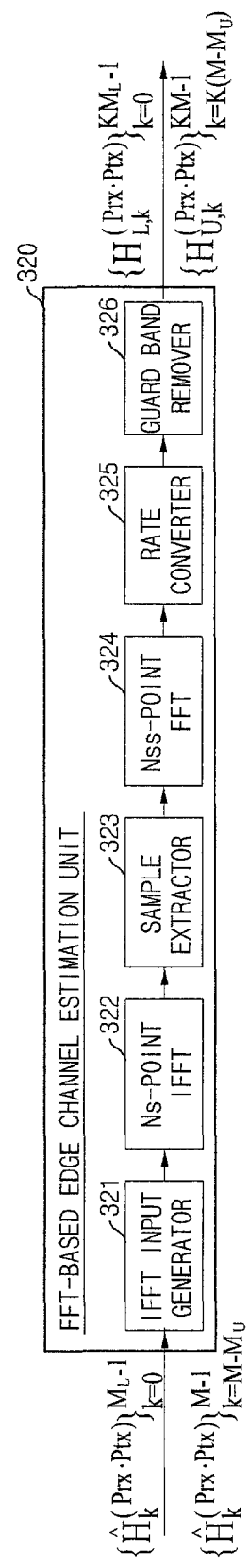
FIG. 8 is a block diagram illustrating an edge channel estimation unit in FIG. 1, according to another exemplary embodiment.

FIG. 8 is a block diagram illustrating the edge channel estimation unit in FIG. 1, according to another exemplary embodiment.

Referring to FIGS. 7 and 8, an edge channel estimation unit 320 according to another exemplary embodiment is configured based on FFT. The edge channel estimation unit 320 includes an IFFT input generator 321, an Ns-point IFFT 322, a sample extractor 323, an Nss-point FFT 324, a rate converter 325, and a guard band remover 326. Herein, since the IFFT input generator 321 has the same configuration and function as those of the IFFT input generator 311 in FIG. 4 and the Ns-point IFFT 322 has the same configuration and function as those of the Ns-point IFFT 312 in FIG. 4, their detailed description will be omitted.

For easily implementing the edge channel estimation unit 320 in FIG. 8, the Nss-point FFT 324 instead of the (K*Ns)-point DFT 314 in FIG. 5 is designed. Subsequently, the rate converter 325 calculates the channel frequency response of a desired portion. Herein, the size 'Nss' of the Nss-point FFT 324 is selected as the exponent of 2 greater than K*Ns.

The sample extractor 323 extracts a plurality of samples on the basis of multipath delay and provides the extracted samples to the Nss-point FFT 324. At this point, the sample extractor 323 extracts only samples in which the power of each sample exceeds a specific value £, and generates an input as expressed in the following Equation.

$$\tilde{g}_{L,n}^{(Prx,Ptx)} = \begin{cases} g_{L,n}^{(Prx,Ptx)}, & |g_{L,n}^{(Prx,Ptx)}|^2 \geq \varepsilon \text{ and } n < W_1 \\ g_{L,n-(N_{S_S}-N_S)}^{(Prx,Ptx)}, & |g_{L,n-(N_{S_S}-N_S)}^{(Prx,Ptx)}|^2 \geq \\ & \varepsilon \text{ and } (n - N_{S_S}) \geq \\ & -W_2, n = 0, 1, \ldots, N_{S_S} - 1 \\ 0, & \text{otherwise} \end{cases}$$

$$\tilde{g}_{U,n}^{(Prx,Ptx)} = \begin{cases} g_{U,n}^{(Prx,Ptx)}, & |g_{U,n}^{(Prx,Ptx)}|^2 \geq \varepsilon \text{ and } n < W_1 \\ g_{U,n-(N_{S_S}-N_S)}^{(Prx,Ptx)}, & |g_{U,n-(N_{S_S}-N_S)}^{(Prx,Ptx)}|^2 \geq \\ & \varepsilon \text{ and } (n - N_{S_S}) \geq \\ & -W_2, n = 0, 1, \ldots, N_{S_S} - 1 \\ 0, & \text{otherwise} \end{cases}$$

The Nss-point FFT 324 receives an FFT input signal, obtained through the sample extractor 323, to calculate channel frequency responses $\{\tilde{G}_{L,k}^{(Prx,Ptx)}\}_{k=0}^{KN_S-1}$ and $\{\tilde{G}_{U,k}^{(Prx,Ptx)}\}_{k=0}^{KN_S-1}$.

Since channel estimation between the pilot sub-carriers is performed "N/Ms" times, the rate converter 225 extracts a channel equal to a pilot sub-carrier interval and calculates a channel frequency response $\{\hat{H}_k^{(Prx,Ptx)}\}_{k=0}^{KM-1}$ for an entire band sub-carrier on the basis of the extracted channel.

The rate converter 325 calculates a K*Ns number of channel frequency responses. As an example, the rate converter 325 may be implemented as a linear converter, or may be implemented with a filter including a plurality of taps. For example, in a case where the rate converter 325 is implemented as the linear converter, a channel frequency response is calculated as expressed in the following Equation, when K*Ns:Nss=μ:ν.

$$\delta_L = \left(\tilde{G}_{L,\nu\cdot i+j+1}^{(Prx,Ptx)} - \tilde{G}_{L,\nu\cdot i+j}^{(Prx,Ptx)}\right)/\mu$$

$$\tilde{G}_{L,\mu\cdot i+j}^{(Prx,Ptx)} = \delta_L \cdot j + \left(\tilde{G}_{L,\nu\cdot i+j}^{(Prx,Ptx)} - j \cdot \delta_L\right),$$

$$i = 0, 1, \ldots, N_{SS}/\nu - 1; j = 0, 1, \ldots, \mu - 1$$

$$\delta_U = \left(\tilde{G}_{U,\nu\cdot i+j+1}^{(Prx,Ptx)} - \tilde{G}_{U,\nu\cdot i+j}^{(Prx,Ptx)}\right)/\mu$$

$$\tilde{G}_{U,\mu\cdot i+j}^{(Prx,Ptx)} = \delta_U \cdot j + \left(\tilde{G}_{U,\nu\cdot i+j}^{(Prx,Ptx)} - j \cdot \delta_U\right),$$

$$i = 0, 1, \ldots, N_{SS}/\nu - 1; j = 0, 1, \ldots, \mu - 1$$

The guard band remover 325 removes a guard band portion, inserted by the IFFT input generator 321, from a K*Ns number of channel frequency responses and calculates a K*M_L number of channel frequency responses and a K*M_U number of channel frequency responses as expressed in the following Equation.

$$\tilde{H}_{L,k}^{(Prx,Ptx)} = \tilde{G}_{L,k+\frac{K(N_S-M_L)}{2}}^{(Prx,Ptx)}, k = 0, 1, \ldots, K \cdot M_L - 1$$

$$\tilde{H}_{U,k}^{(Prx,Ptx)} = \tilde{G}_{U,k+\frac{K(N_S-M_L)}{2}}^{(Prx,Ptx)}, k = 0, 1, \ldots, K \cdot M_U - 1$$

Referring again to FIG. 1, when an edge channel estimation mode is selected through the edge channel estimation mode selection unit 400, the channel frequency response output unit 500 outputs a final channel frequency response result on the basis of the band channel frequency response of an entire band from the entire band channel estimation unit 200 and a channel frequency response result from the edge channel estimation unit 300.

The channel frequency response output unit 500 may receive the channel frequency responses of the left and right edge regions LR and RR, which are outputted from the edge channel estimation unit 300, to output the final channel frequency response result.

In this embodiment, however, the channel frequency response output unit 500 may receive only a portion of the channel frequency responses of the left and right edge regions LR and RR to output the final channel frequency response result, as expressed in the following Equation.

$$\overline{H}_k^{(Prx,Ptx)} = \begin{cases} \tilde{H}_{L,k}^{(Prx,Ptx)}, & 0 \leq k < M_{LI} \\ \tilde{H}_k^{(Prx,Ptx)}, & M_{LI} \leq k < K \cdot M - M_{UI} \\ \tilde{H}_{U,k-(K \cdot M - M_U)}^{(Prx,Ptx)}, & K \cdot M - M_{UI} \leq k < K \cdot M - 1 \end{cases}$$

A channel frequency response calculated by the edge channel estimation unit 300, moreover, is better in performance than a channel frequency response calculated by the entire band channel estimation unit 200. However, the Gibbs phenomenon may occur in the both end portions of the left edge region LR of an IFFT input and the both end portions of the right edge region RR of the IFFT input. Accordingly, in a case that receives the channel frequency response of each edge region to configure a channel frequency response result, performance may be degraded. For example, as illustrated in FIG. 6, when four pilot sub-carriers are assigned to the left edge region LR of the IFFT input, only channel frequency responses for other two pilot sub-carriers V3 and V4 other than the both end portions V1 and V2 of the left edge region LR may be calculated.

When the edge channel estimation mode is not selected through the edge channel estimation mode selection unit 400, as expressed in the following Equation, the channel frequency response calculated by the entire band channel estimation unit 200 is obtained as a final channel frequency response as-is.

$$\overline{H}_k^{(Prx,Ptx)} = \tilde{H}_k^{(Prx,Ptx)}, k=0, 1, \ldots, KM-1$$

Figure 9:
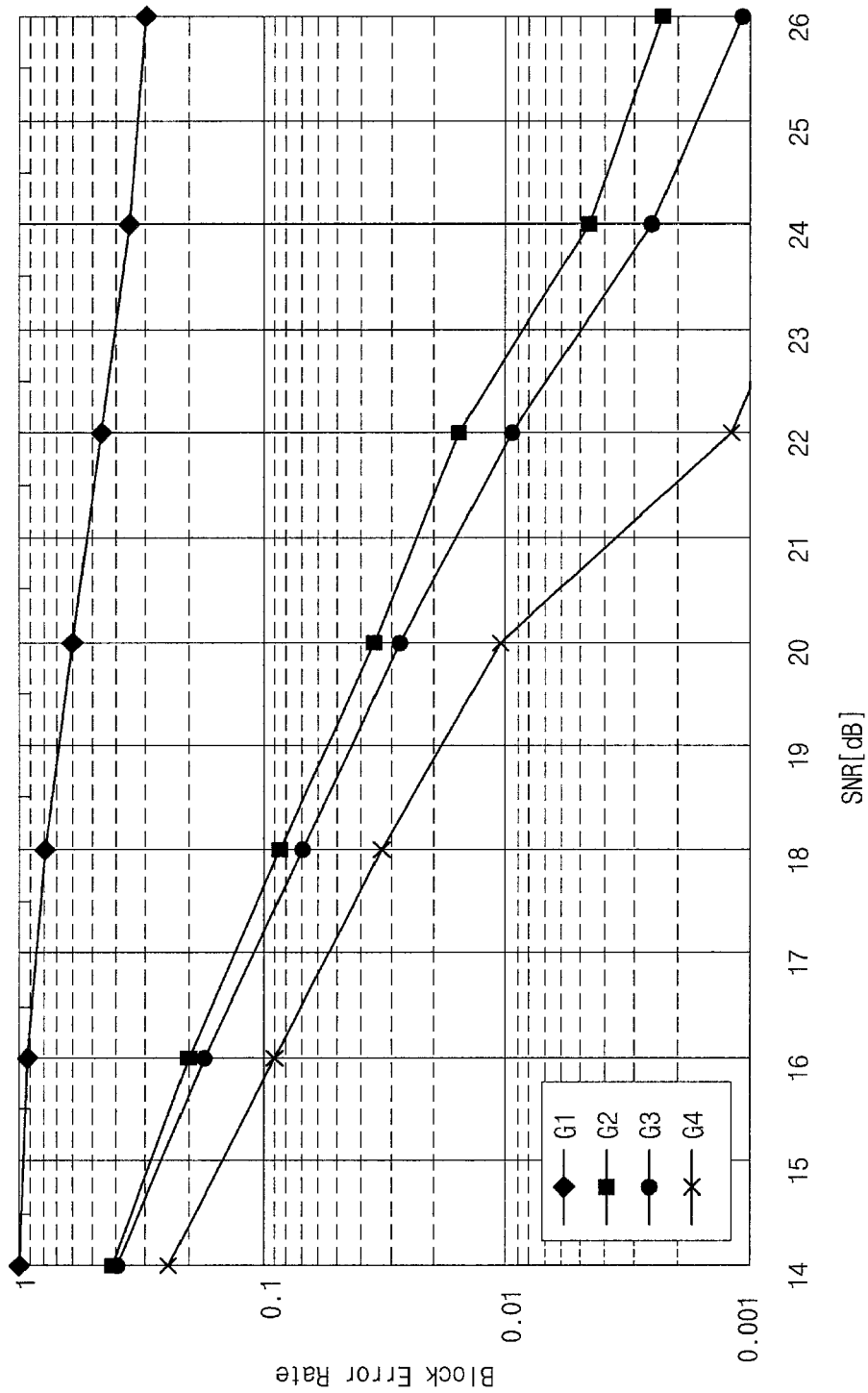
FIG. 9 is a graph illustrating a block error rate in a case of applying the channel estimation apparatus in FIG. 1.

FIG. 9 is a graph illustrating a block error rate in a case of applying the channel estimation apparatus in FIG. 1. FIG. 9 illustrates a block error rate in a case of applying a typical urban 6 path model, in an OFDMA system using a 2048 size of FFT. In FIG. 9, among 2048 sub-carriers in a transmission bandwidth, the number of effective sub-carriers is 1200, and among the effective sub-carriers, the number of pilot sub-carriers is 200. In FIG. 9, moreover, 24 sub-carriers are assigned to a left edge, the 64 QAM is applied as a modulation scheme, and a coding rate represents a block error rate in a case where it is set to ⅔.

FIG. 9 substantially illustrates four graphs G1 to G4. The graph G1 is one that illustrates a channel estimation result using only entire band channel estimation. The graph G2 is one that illustrates the channel estimation result of the edge region of the edge channel estimation unit in FIG. 5, and the graph G3 is one that illustrates the channel estimation result of the edge region of the edge channel estimation unit in FIG. 8. The graph G4 is one that illustrates an ideal channel estimation result.

In a case where the edge channel estimation mode is not set and only an entire band channel estimation scheme is applied (i.e., a=0.6), as illustrated in the graph G1, an error floor occurs in a block error rate and thus performance is not improved even when an SNR increases.

However, in a case where a channel estimation operation is performed using the edge channel estimation scheme, as illustrated in the graphs G2 and G3, it can be seen that a 1.2 dB error with respect to the graph G4 merely occurs. Accordingly, it can be seen that channel estimation performance is improved through the edge channel estimation scheme.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A channel estimation method in a mobile communication system, the channel estimation method comprising:
    extracting a plurality of samples, in which a power of a sample in a time domain exceeds a first critical value, from a received pilot signal to perform channel estimation of an entire frequency band;
    extracting a plurality of samples, in which a power of a sample in a time domain exceeds a second critical value, from an edge of an Inverse Fast Fourier Transform (IFFT) input in the received pilot signal to perform channel estimation on the edge of the IFFT input; and
    estimating a final channel frequency response on the basis of the channel estimation result of the entire frequency band and the channel estimation result for the edge of the IFFT input.

2. The channel estimation method of claim 1, wherein the performing of channel estimation of an entire frequency band comprises performing channel estimation on channel frequency responses of M pilot sub-carriers between a left guard band and a right guard band.

3. The channel estimation method of claim 2, wherein the performing of channel estimation on the edge of the IFFT input comprises:
    estimating a channel for a channel frequency response of the left edge region of the IFFT input to which $M_L$ sub-carriers adjacent to the left guard band among the M pilot sub-carriers are assigned; and
    estimating a channel for a channel frequency response of the right edge region of the IFFT input to which $M_U$ pilot sub-carriers adjacent to the right guard band among the M pilot sub-carriers are assigned.

4. The channel estimation method of claim 3, wherein the $M_L$ and the $M_U$ are about 6 and 7.

5. The channel estimation method of claim 4, wherein in each edge region to which 6 and 7 pilot sub-carriers are assigned, a sub-carrier interval is 15 KHz and an interval between the pilot sub-carriers is 6, and a bandwidth is about 600 KHz.

6. The channel estimation method of claim 1, wherein the performing of channel estimation on the edge of the IFFT input comprises performing channel estimation according to any one of a Discrete Fourier Transform (DFT) scheme and a Fast Fourier Transform (FFT) scheme.

7. The channel estimation method of claim 6, wherein the performing of channel estimation according to a DFT scheme comprises:
    expanding channel frequency responses of both end pilot sub-carriers of the $M_L$ pilot sub-carriers through an Inverse Fast Fourier Transform (IFFT) input generator, inserting the expanded channel frequency responses into a left guard band to expand the IFFT input (hereinafter referred to as an IFFT input of a left edge) of an Ns size corresponding to the left edge and channel frequency responses of both end pilot sub-carriers of the $M_U$ pilot sub-carriers, and inserting the expanded channel frequency responses into a right guard band to generate the IFFT input (hereinafter referred to as an IFFT input of a right edge) of the Ns size corresponding to the right edge;

calculating a time domain response of a pilot signal for the IFFT inputs of the left and right edges;

extracting samples of the IFFT inputs of the left and right edges exceeding the second critical value among the calculated time domain responses; and calculating channel frequency responses for the samples of the IFFT inputs of the left and right edges which are assigned to a K*Ns number, in the DFT scheme; and removing the expanded channel frequency responses which are inserted into the left and right guard bands to calculate channel frequency responses for the left and right edges, wherein the Ns is a natural number which is an exponent of 2 greater than the $M_L$ and the $M_U$, and the K is an interval between the pilot sub-carriers.

8. The channel estimation method of claim 6, wherein the performing of channel estimation according to an FFT scheme comprises:

expanding channel frequency responses of both end pilot sub-carriers of the $M_L$ pilot sub-carriers through an Inverse Fast Fourier Transform (IFFT) input generator, inserting the expanded channel frequency responses into a left guard band to expand the IFFT input (hereinafter referred to as an IFFT input of a left edge) of an Ns size corresponding to the left edge and channel frequency responses of both end pilot sub-carriers of the $M_U$ pilot sub-carriers, and inserting the expanded channel frequency responses into a right guard band to generate the IFFT input (hereinafter referred to as an IFFT input of a right edge) of the Ns size corresponding to the right edge;

calculating a time domain response of a pilot signal for the IFFT inputs of the left and right edges;

extracting samples of the IFFT inputs of the left and right edges exceeding the second critical value among the calculated time domain responses;

calculating channel frequency responses for the samples of the IFFT inputs of the left and right edges which are assigned at an Nss size, in the FFT scheme, wherein the Nss is a natural number which is an exponent of 2 greater than a K*Ns number, the Ns is a natural number which is an exponent of 2 greater than the $M_L$ and the $M_U$, and the K is an interval between the pilot sub-carriers;

calculating channel frequency responses for the samples of the IFFT inputs of the left and right edges according to a ration of the K*Ns and the Nss; and removing the expanded channel frequency responses which are inserted into the left and right guard bands to calculate channel frequency responses for the left and right edges.

9. A channel estimation method in a mobile communication system, the channel estimation method comprising:

extracting a plurality of samples, in which a power of a sample in a time domain exceeds a first critical value, from a received pilot signal to perform channel estimation of an entire frequency band;

setting an edge channel estimation mode; and extracting a plurality of samples, in which a power of a sample in a time domain exceeds a second critical value, from an edge of an Inverse Fast Fourier Transform (IFFT) input in the received pilot signal to perform channel estimation on the edge of the IFFT input, according to the edge channel estimation mode.

10. The channel estimation method of claim 9, wherein the setting of an edge channel estimation mode comprises setting the edge channel estimation mode when the received pilot signal is modulated in a 16 Quadrature Amplitude Modulation (QAM) scheme and a 64 QAM scheme and received.

11. The channel estimation method of claim 9, further comprising estimating a channel estimation result of the entire frequency band as a final channel frequency response, when the edge channel estimation mode is not set.

12. A channel estimation apparatus in a mobile communication system, the channel estimation apparatus comprising:

an entire band channel estimation unit extracting a plurality of samples, in which a power of a sample in a time domain exceeds a first critical value, from a received pilot signal to perform channel estimation of an entire frequency band;

an edge channel estimation unit extracting a plurality of samples, in which a power of a sample in a time domain exceeds a second critical value, from an edge of an Inverse Fast Fourier Transform (IFFT) input in the received pilot signal to perform channel estimation on the edge of the IFFT input; and a channel frequency response output unit estimating a final channel frequency response on the basis of the channel estimation result of the entire frequency band and the channel estimation result for the edge of the IFFT input.

13. The channel estimation apparatus of claim 12, further comprising a Least Square (LS) channel estimation unit calculating channel frequency responses of M pilot sub-carriers which are received through a plurality of reception antennas in an LS technique, and outputting the calculated channel frequency response to the entire band channel estimation unit and the edge channel estimation unit.

14. The channel estimation apparatus of claim 13, further comprising an edge channel estimation mode selection unit selectively transferring the channel frequency responses of the M pilot sub-carriers to the edge channel estimation unit according to an edge channel estimation mode.

15. The channel estimation apparatus of claim 14, wherein:
the edge channel estimation mode selection unit transfers the channel frequency responses of the M pilot sub-carriers between a left guard band and a right guard band to the edge channel estimation unit,
the edge channel estimation mode selection unit transfers a channel frequency response of a left edge region of the IFFT input, to which $M_L$ pilot sub-carriers adjacent to the left guard band among the M pilot sub-carriers are assigned, and a channel frequency response of a right edge region of the IFFT input, to which $M_U$ pilot sub-carriers adjacent to the left guard band among the M pilot sub-carriers are assigned, to the edge channel estimation unit.

16. The channel estimation apparatus of claim 15, wherein when a sub-carrier interval is about 15 KHz, an interval between the pilot sub-carriers is about 6 and bandwidths of the left and right edge regions of the IFFT input are about 600 KHz, the $M_L$ and the $M_U$ are about 6 and 7.

17. The channel estimation apparatus of claim 15, wherein the edge channel estimation unit comprises:

an Inverse Fast Fourier Transform (IFFT) input signal generator expanding channel frequency responses of both end pilot sub-carriers of the $M_L$ pilot sub-carriers, inserting the expanded channel frequency responses into a left guard band to expand the IFFT input (hereinafter referred to as an IFFT input of a left edge) of an Ns size corresponding to the left edge and channel frequency responses of both end pilot sub-carriers of the $M_U$ pilot sub-carriers, and inserting the expanded channel frequency responses into a right guard band to generate the IFFT input (hereinafter referred to as an IFFT input of a right edge) of the Ns size corresponding to the right edge;

an IFFT calculating a time domain response of a pilot signal for the IFFT inputs of the left and right edges;

a sample extractor extracting samples of the IFFT inputs of the left and right edges exceeding the second critical value among the calculated time domain responses;

a Discrete Fourier Transform (DFT) calculating channel frequency responses for the samples of the IFFT inputs of the left and right, in the DFT scheme; and a guard band remover removing the expanded channel frequency responses which are inserted into the left and right guard bands to calculate channel frequency responses for the left and right edges.

18. The channel estimation apparatus of claim 15, wherein the edge channel estimation unit comprises:

an IFFT input signal generator expanding channel frequency responses of both end pilot sub-carriers of the $M_L$ pilot sub-carriers, inserting the expanded channel frequency responses into a left guard band to expand the IFFT input (hereinafter referred to as an IFFT input of a left edge) of an Ns size corresponding to the left edge and channel frequency responses of both end pilot sub-carriers of the $M_U$ pilot sub-carriers, and inserting the expanded channel frequency responses into a right guard band to generate the IFFT input (hereinafter referred to as an IFFT input of a right edge) of the Ns size corresponding to the right edge;

an IFFT calculating a time domain response of a pilot signal for the IFFT inputs of the left and right edges;

a sample extractor extracting samples of the IFFT inputs of the left and right edges exceeding the second critical value among the calculated time domain responses;

a Fast Fourier Transform (FFT) calculating channel frequency responses for the samples of the IFFT inputs of the left and right edges which are assigned at an Nss size, in the FFT scheme, wherein the Nss is a natural number which is an exponent of 2 greater than a K*Ns number, the Ns is a natural number which is an exponent of 2 greater than the $M_L$, and the $M_U$, and the K is an interval between the pilot sub-carriers;

a rate converter calculating channel frequency responses for the samples of the IFFT inputs of the left and right edges according to a ration of the K*Ns and the Nss; and a guard band remover removing the expanded channel frequency responses which are inserted into the left and right guard bands to calculate channel frequency responses for the left and right edges.

\* \* \* \* \*